US008861533B1

(12) United States Patent
Durrett et al.

(10) Patent No.: US 8,861,533 B1
(45) Date of Patent: Oct. 14, 2014

(54) DEMARCATION POINT FOR ETHERNET SERVICE AND METHODS OF PROVIDING ETHERNET SERVICE

(75) Inventors: D. Mark Durrett, Cary, NC (US); Stephen S. Jackson, Chapel Hill, NC (US); Kevin J. Sheehan, Raleigh, NC (US)

(73) Assignee: Overture Networks, Inc., Morrisville, NC (US)

( * ) Notice: Subject to any disclaimer, the term of this patent is extended or adjusted under 35 U.S.C. 154(b) by 3615 days.

(21) Appl. No.: 10/600,872

(22) Filed: Jun. 20, 2003

Related U.S. Application Data

(60) Provisional application No. 60/390,141, filed on Jun. 20, 2002.

(51) Int. Cl.
*H04L 12/28* (2006.01)
*H04L 12/56* (2006.01)
*H04L 29/06* (2006.01)
*H04L 12/66* (2006.01)

(52) U.S. Cl.
CPC .............. *H04L 29/06* (2013.01); *H04L 12/66* (2013.01)
USPC ........................................... 370/401

(58) Field of Classification Search
USPC ................... 370/389, 401, 351–357
See application file for complete search history.

(56) References Cited

U.S. PATENT DOCUMENTS

| | | | | |
|---|---|---|---|---|
| 5,692,126 A * | 11/1997 | Templeton et al. | ........... | 709/249 |
| 5,802,285 A * | 9/1998 | Hirviniemi | .................. | 709/250 |
| 5,845,068 A * | 12/1998 | Winiger | ........................... | 726/3 |
| 5,982,741 A * | 11/1999 | Ethier | ........................... | 370/201 |
| 6,115,755 A * | 9/2000 | Krishan | ......................... | 709/250 |
| 6,173,325 B1 * | 1/2001 | Kukreja | ......................... | 709/224 |
| 6,289,015 B1 * | 9/2001 | Warner et al. | .................. | 370/392 |
| 6,466,571 B1 * | 10/2002 | Dynarski et al. | .............. | 370/352 |
| 6,744,759 B1 * | 6/2004 | Sidhu et al. | .................... | 370/356 |
| 6,829,234 B1 * | 12/2004 | Kaplan et al. | ................... | 370/352 |
| 6,856,616 B1 * | 2/2005 | Schuster et al. | .............. | 370/352 |
| 6,870,830 B1 * | 3/2005 | Schuster et al. | .............. | 370/352 |
| 7,031,324 B1 * | 4/2006 | Goody | ........................... | 370/401 |
| 7,072,360 B2 * | 7/2006 | Dravida et al. | ................. | 370/468 |
| 7,092,362 B1 * | 8/2006 | Demakakos et al. | ......... | 370/249 |
| 7,257,113 B2 * | 8/2007 | O'Connor | ..................... | 370/353 |
| 7,283,519 B2 * | 10/2007 | Girard | ........................... | 370/353 |
| 2002/0089973 A1 * | 7/2002 | Manor | ........................... | 370/352 |
| 2002/0101860 A1 * | 8/2002 | Thornton et al. | .............. | 370/352 |
| 2003/0133450 A1 * | 7/2003 | Baum | ........................... | 370/389 |

* cited by examiner

*Primary Examiner* — Phirin Sam
*Assistant Examiner* — Blanche Wong
(74) *Attorney, Agent, or Firm* — Myers Bigel Sibley & Sajovec (57) ABSTRACT

Methods, systems and devices are provided that facilitate the provision of Ethernet service between remotely located Ethernet local area networks (LANs). At least one network interface unit (NIU) is provided that is configured to provide an Ethernet interface between service provider equipment and customer equipment so as to provide Ethernet service between a service provider network and an Ethernet local area network (LAN) running at a customer facility. The NIU is further configured to manage the Ethernet service between the service provider network and the Ethernet LAN running at the customer facility.

31 Claims, 5 Drawing Sheets

DEMARCATION POINT FOR ETHERNET SERVICE AND METHODS OF PROVIDING ETHERNET SERVICE

RELATED APPLICATION

This application is related to and claims priority from U.S. Provisional Application Ser. No. 60/390,141, filed Jun. 20, 2002, entitled Apparatus for Modular Ethernet Demarcation Point, the disclosure of which is hereby incorporated herein by reference as if set forth in its entirety.

FIELD OF THE INVENTION

The present invention relates to network communications and, more particularly, to Ethernet communications devices and related methods.

BACKGROUND OF THE INVENTION

Most businesses today have local area networks (LANs) running in the building within which the business is located. These LANs may be used to send and/or receive information internally. Typically, Ethernet LANs use Gigabit Ethernet connectivity running at, for example, 1000 Megabits/second (Mbps) and store target content on servers connected to the Ethernet links with speeds of 100 Mbps or greater. However, information sent to a location outside the building or campus via public network facilities or information requested from servers outside the building using public network facilities may only be sent at speeds of about 1.5 Mbps or less. This may be due, in part, to the bandwidth limitations of conventional transports like, for example, T1, digital subscriber links (DSLs), cable and the like. Thus, information transmitted to or received from servers outside of an Ethernet LAN may experience a $1/1000^{th}$ decrease in available bandwidth.

Accordingly, service providers are trying to bridge the gap of service and performance between backbone networks and the Ethernet LANs of their business customers. With greater than ninety percent of all businesses being connected to the public infrastructure via copper and/or standard phone lines, increasing the service and bandwidth potential to these customers may be problematic. Carriers are constrained with the technologies they currently have at their disposal due to the relatively low levels of bandwidth that can be delivered over a single copper connection. These platforms, primarily legacy asynchronous transfer mode (ATM) based platforms, were not designed to scale and meet the current bandwidth requirements.

Furthermore, existing technologies used to communicate between remote locations, for example, time division multiplexing (TDM) and ATM, are typically optimized for voice traffic. For example, ATM packets running across DSL is optimized for voice and/or time division multiplexed (TDM) traffic. Services, such as cable and DSL, are typically used for small businesses and may not be capable of providing highly reliable service for high capacity, high margin data. Typically, large businesses demand a business class communications service, for example, T1. However, even T1 is limited, as discussed above, by the existing infrastructure. Accordingly, a carrier grade solution for reliable delivery of high capacity, high margin data services to and/or between customers may be desired.

SUMMARY OF THE INVENTION

Embodiments of the present invention provide systems, apparatus and methods that facilitate the provision of Ethernet service. At least one network interface unit (NIU) is provided that is configured to provide an Ethernet interface between service provider equipment and customer equipment so as to provide Ethernet service between a service provider network and an Ethernet local area network (LAN) running at a customer facility. The NIU is further configured to manage the Ethernet service between the service provider network and the Ethernet LAN running at the customer facility.

In some embodiments of the present invention, a housing may be positioned between the service provider equipment and the customer equipment at a service provider facility and/or the customer facility. The housing may be configured to receive the at least one NIU and the at least one NIU may be positioned in the housing. In certain embodiments of the present invention, the at least one NIU may be further configured to test and/or monitor the Ethernet service between the service provider network and the Ethernet LAN running at the customer facility.

In further embodiments of the present invention, the at least one NIU may include first and second NIUs. The first NIU may provide a first Ethernet interface between the service provider equipment of a first service provider and the customer equipment of a first customer so as to provide Ethernet service between a first service provider network and an Ethernet LAN running at a first customer facility. The second NIU may provide a second Ethernet interface between the service provider equipment of a second service provider and the customer equipment of a second customer so as to provide Ethernet service between the second service provider network and an Ethernet LAN running at a second customer facility.

In still further embodiments of the present invention, the first and second service providers may be the same service provider and the first and second customers may communicate using Ethernet service provided to the first and second customers by the service provider. In certain embodiments of the present invention, the at least one NIU may be positioned at a service provider facility and/or at a customer facility. Furthermore, the at least one network interface unit may be coupled to the service provider equipment through a remote terminal.

In some embodiments of the present invention, a connection between the at least one NIU and the service provider equipment may include a copper connection and/or a fiber optic connection. The at least one NIU may include an Ethernet receptacle and the connection between the at least one NIU and the customer equipment may be provided by category 5 xcable and/or fiber optic cable having a connector that is configured to be positioned in the Ethernet receptacle. The Ethernet receptacle may be configured to receive an RJ45 and/or an LC connector. The connector of the category 5 cable may include an RJ45 connector and the connector of the fiber optic cable may include an LC connector.

In further embodiments of the present invention the housing may include at least one of a T200 mechanical enclosure and a T400 mechanical enclosure. The at least one NIU may be configured to be electrically coupled to the housing through a 56-pin edge connector. The housing may be positioned in a neutral location so as to allow access by a technician.

DETAILED DESCRIPTION OF THE INVENTION

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like reference numerals refer to like elements throughout.

It will be understood that although the terms first and second are used herein to describe various components of the present invention, these components should not be limited by these terms. These terms are only used to distinguish one component from another component. Thus, a first component discussed below could be termed a second component, and similarly, a second component may be termed a first component without departing from the teachings of the present invention.

Embodiments of the present invention will be discussed below with respect to FIGS. 1 through 7. Embodiments of the present invention provide systems, apparatus and methods that may enable a first Ethernet local area network (LAN) to connect to a second Ethernet LAN using Ethernet service. In certain embodiments of the present invention, a network interface unit (NIU) is provided at, for example, first and second customer facilities. The NIUs may provide Ethernet interfaces between a service provider network and first and second Ethernet LANs running at the first and second customer facilities. Thus, Ethernet service may be provided between the first Ethernet LAN and the second Ethernet LAN through the service provider network.

Furthermore, NIUs according to embodiments of the present invention may provide a demarcation point that defines an end of the service provider's circuit responsibility, i.e. a service termination point. The NIU may also be configured to provide many functions, for example, the NIU may be used as a physical media conversion device for, for example, converting information formatted for fiber optic cable to information formatted for category five cable. The NIU may also be used to test and/or monitor the line from a remote location, i.e. not at the customer facility, and the like. The ability to provide Ethernet service beyond conventional LANs and monitor and/or test the functionality of the Ethernet service off-site may enable the provision of a carrier grade solution for reliable delivery of high capacity, high margin data services to and/or between customers as discussed further below.

As used herein the term "Ethernet" refers to a packet switched network capable of running at rates from about 10 to about 1000 Megabits per second (Mbps) that may be optimized for data traffic. Ethernet has been around for about thirty years and was originally designed for use as a LAN within a designated area. Originally, limitations of the infrastructure, i.e. equipment and connection wires, limited the distance over which Ethernet could be used as well as the bandwidth it could support. For example, existing telephone lines are not capable of handling 10 to 100 Mbps speeds. Recently, the quality and standards of the Ethernet equipment at the central office and at the customer facility have improved. Furthermore, the need for a long distance data service capable of handling a large amount of data reliably at high speeds has increased. Thus, embodiments of the present invention allow Ethernet service to be deployed beyond individual LANs to provide a long distance data service capable of handling large of amounts of data reliably at high speeds. According to embodiments of the present invention, Ethernet LANs may be extended beyond internal systems over existing or newly installed lines, for example, copper loop and/or fiber optic cable. According to further embodiments of the present invention, a copper loop connection may transmit and/or receive data from a LAN at about 10 Mbps and a fiber optic cable may transmit and/or receive data from a LAN at about 100 Mbps or 1000 Mbps as discussed further herein.

Figure 1:
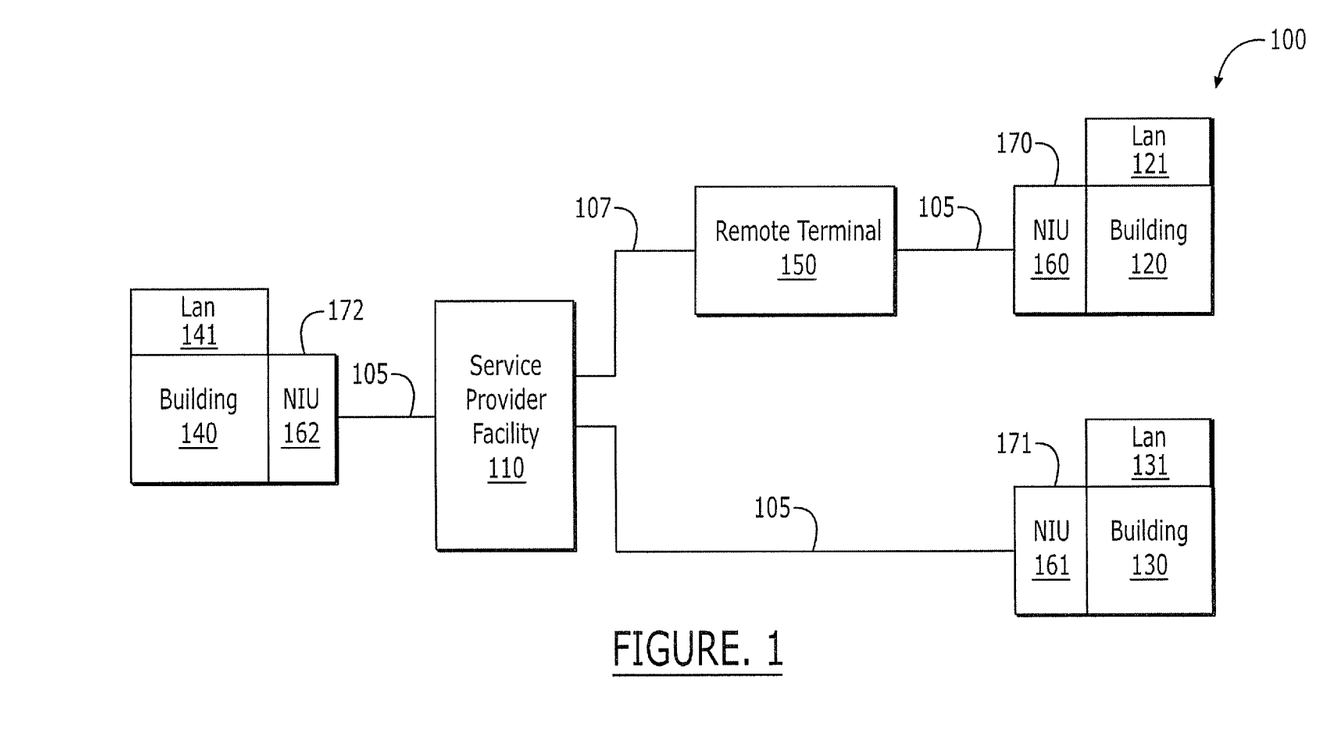
FIG. 1 is a block diagram of systems including network interface units (NIUs) according to embodiments of the present invention.

Now referring to FIG. 1, an exemplary system including NIUs according to embodiments of the present invention will be discussed. As illustrated in FIG. 1, a system 100 according to embodiments of the present invention may include, for example, a service provider facility 110, a remote terminal 150, first, second and third buildings 120, 130 and 140 and first, second and third NIUs 160, 161 and 162. The service provider facility 110 may be, for example, a conventional central office, including equipment used, for example, for time division multiplex (TDM) services as well as other conventional services.

As illustrated, a remote terminal 150 may be placed between the service provider facility 110 and a customer facility, for example, the first building 120 housing at least one customer, as illustrated in FIG. 1. A service provider may locate service provider equipment at the remote terminal 150 and extend services, for example, Ethernet services, from the remote terminal 150 to the customer facility. The connection 105 between the remote terminal 150 and a customer facility, for example, the first, second and third buildings 120, 130 and 140 may be, for example, a copper loop connection and/or a fiber optic cable connection. The connection 105 between the service provider facility 110 and the customer facility may also be, for example, a copper loop connection and/or a fiber optic cable connection. These connections 105 may be used to provide Ethernet services to the first, second and/or third buildings 120, 130 and/or 140 according to embodiments of the present invention. The connection 107 between the service provider facility 110 and the remote terminal 150 may include, for example, a copper line, a fiber optic cable, a telephone line over which digital subscriber line (DSL) service and the like may be provided.

The first, second and third buildings 120, 130 and 140 may be associated with first, second and third NIUs 160, 161 and 162, respectively. The first, second and third NIUs 160, 161 and 162 may be positioned in first, second and third housings 170, 171 and 172, respectively. It will be understood that the first, second and/or third buildings 120, 130 and/or 140 may include one or more businesses and/or customers. It will be further understood that the business and/or customers may each have one or more dedicated NIUs 160, 161 and 162 positioned in an associated housing 170, 171 and 172. Thus, for example, in high rise buildings housing many businesses/customers, the associated housing 170, 171 and 172 may include multiple NIUs 160, 161 and 162. Accordingly, multi-slot housings may be used in multi tenant buildings and/or office parks to provide a single housing that services multiple customers.

Furthermore, the first, second and third housings 170, 171 and 172 may be positioned in a neutral location so that a technician may access the NIUs positioned in the housing. Thus, the service provider can monitor and/or service the Ethernet lines and/or equipment without requiring customer interference. In other words, the housing may provide a termination point for the service provided by the service provider, i.e. the service provider is not responsible for anything beyond the housing. The housing may be configured to supply, for example, power, physical support of and protection for the NIUs. The housing, i.e. enclosure, mechanical housing and/or demarcation point, may be a conventional mechanical enclosure used for, for example, T1 network interface cards. The mechanical enclosure may include, for example, a T200 mechanical enclosure and/or a T400 mechanical enclosure that are known to those having skill in the art. It will be understood that both conventional telecommunications interface cards, for example, T1 network interface cards, and NIUs according to embodiments of the present invention may be provided in the same housing 170, 171 and 172 without departing from the teachings of the present invention.

NIUs 160, 161 and 162 according to embodiments of the present invention may be integrated with existing equipment and infrastructure and facilitate the provision of carrier grade Ethernet between a service provider facility 110 and a customer facility. NIUs 160, 161 and 162 according to embodiments of the present invention may provide a physical media conversion device between the media connected to the service provider equipment at the service provider facility and the media connected to the LAN 121, 131 and 141 running at the customer facility. For example, the media connected to the service provider equipment may be, for example, fiber optic cable, and the media connected to the LAN may be, for example, category five cable. Thus, the NIU may be configured to convert the information formatted for the fiber optic cable to information formatted for category five cable. The NIU may be further configured to test and/or monitor the Ethernet service between the service provider's network and the NIU and/or the Ethernet service on the LAN running at the customer facility 110. The testing and/or monitoring may be done at the NIU/demarcation point or remotely from, for example, the service provider facility.

In particular, the NIU may be configured to send and/or receive packets that allow the technicians to monitor and/or test the performance of the connection. Performance data may include error reports for packets traveling on the service provider end of the signal connection or traveling on the customer's LAN. The NIU may also be configured to operate in a loop back mode, where a specific pattern of information may be transmitted to the customer facility, traverse the signal line to the NIU and/or the LAN at the customer facility and transmitted back to the service provider facility from the customer facility. The original pattern may be compared to the pattern transmitted back to the service provider facility to verify that the Ethernet service is functioning properly. Thus, the NIU may provide both a physical media conversion device as well as a diagnostics tool for monitoring and/or testing the Ethernet signal between the service provider facility and the customer facility. Accordingly, the service provider may manage the network up to the point where it hands off the signal to the customer's LAN, which may be done remotely. The data obtained from testing and/or monitoring the signal line from, for example, a remote location, may be useful in the operation of Ethernet Service between LANs.

Figure 3:
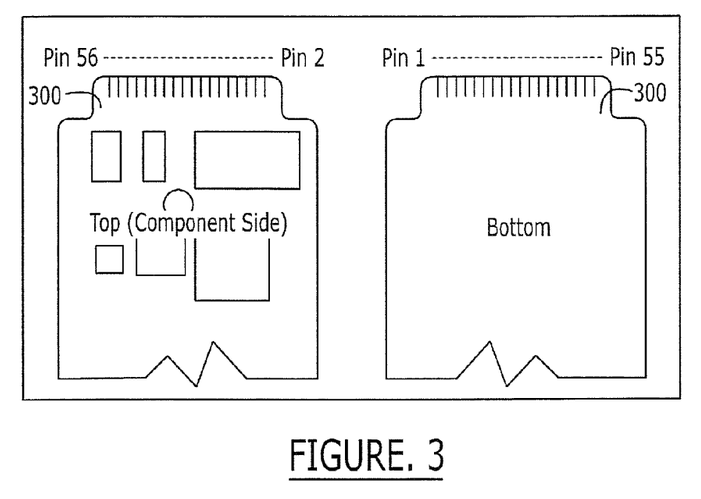
FIG. 3 is a diagram illustrating NIUs according to embodiments of the present invention.
Figure 4:
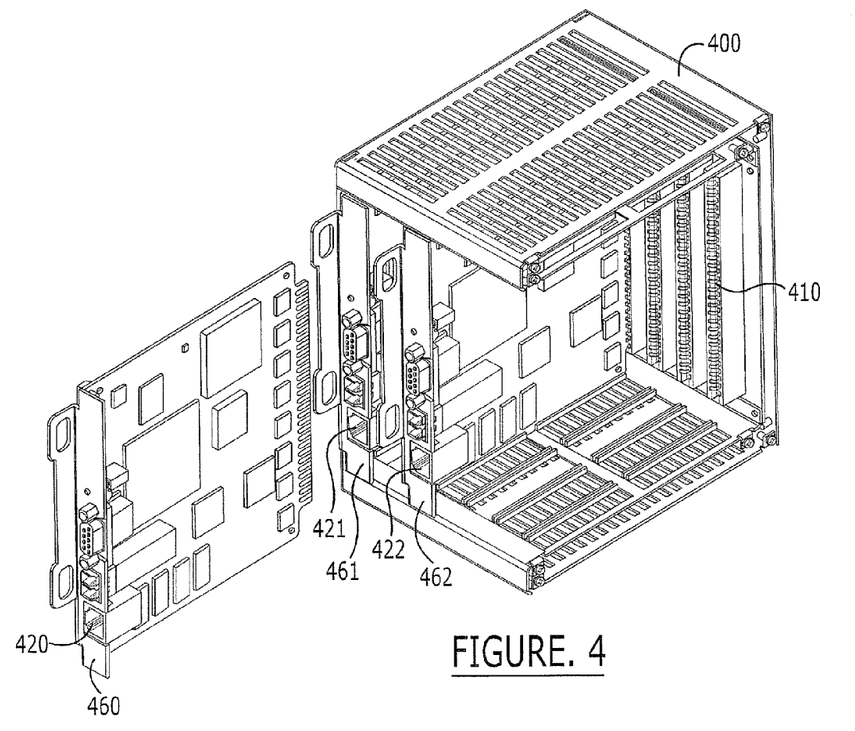
FIG. 4 is a diagram illustrating NIUs positioned in mechanical enclosures according to embodiments of the present invention.

Referring now to FIGS. 3 and 4, embodiments of NIUs and mechanical enclosures according to embodiments of the present invention will be discussed. An exemplary mechanical enclosure 400 is illustrated in FIG. 4. Although the mechanical enclosure 400 of FIG. 4 illustrates multiple NIUs 460, 461 and 462 positioned or being positioned in the mechanical enclosure 400, embodiments of the present invention are not limited to this configuration. For example, a mechanical enclosure 400 may be configured to receive one NIU or more than three NIUs without departing from the teachings of the present invention. As further illustrated in FIG. 4, the mechanical enclosure 400 includes one or more sockets 410.

NIUs according to embodiments of the present invention may be configured to be positioned in the sockets 410 of the mechanical enclosure 400. Furthermore, the NIU may be designed such that power, input, output and control signals appear at voltages and frequencies known to those having skill in the art, on contacts which may have physical and electrical compatibility with conventional connector sockets 410. For example, as illustrated in FIG. 3 an NIU may be configured to be connected to the mechanical enclosure 400 through a 56-pin edge connector 300.

Referring again to FIG. 4, the NIU 460, 461 and 462 may further include an Ethernet receptacle 420, 421 and 422. The Ethernet receptacle 420, 421 and 422 may provide a connection between the NIU 420, 421 and 422 and the customer equipment on which the customers Ethernet LAN may be running. This connection between the NIU and the LAN may be provided by, for example, a category 5 cable or an optical cable having a connector, for example, an RJ45 connector, that is configured to be positioned in the Ethernet receptacle. In the embodiments of the present invention using the RJ45 connector, the Ethernet receptacle 420, 421 and 422 may be configured to receive the RJ45 connector.

Figure 2:
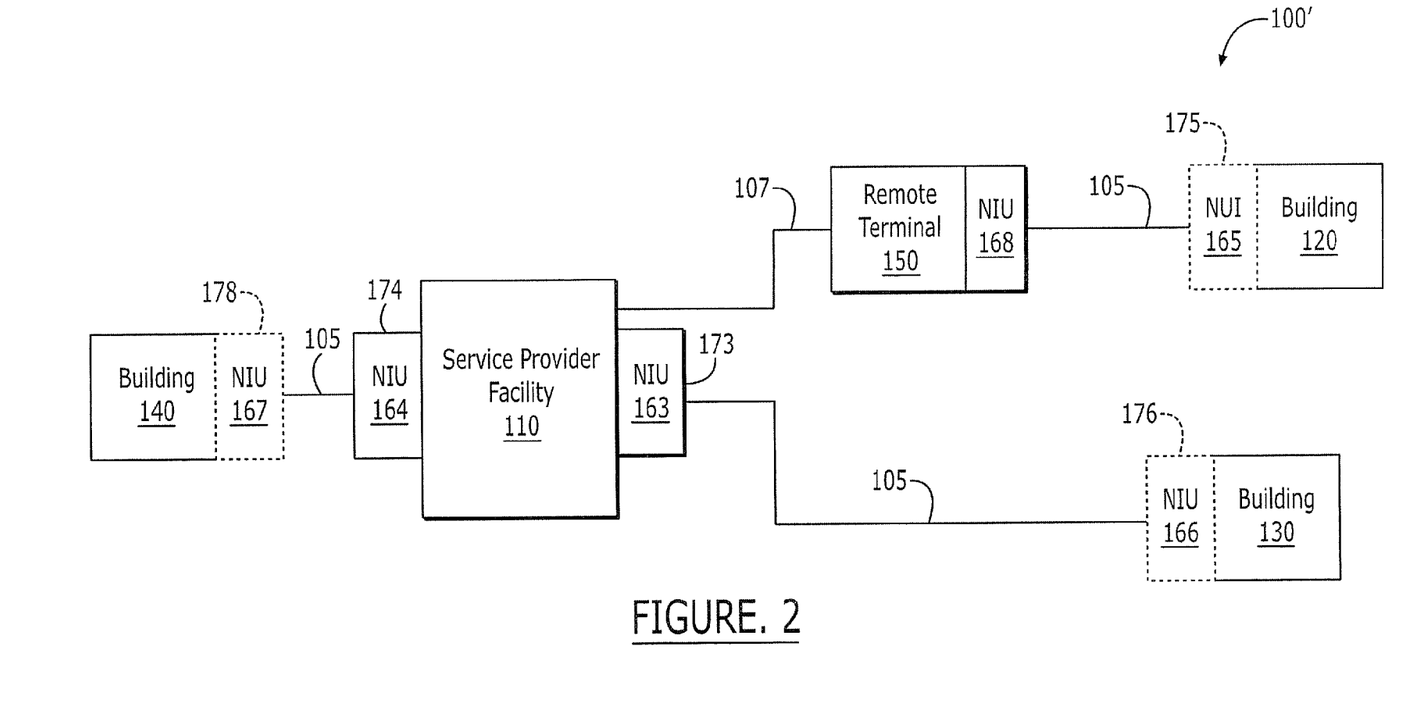
FIG. 2 is a block diagram of systems including NIUs according to further embodiments of the present invention.

Furthermore, in the system 100 illustrated in FIG. 1, the first, second and third NIUs 160, 161 and 163 are positioned at the first, second and third buildings 120, 130 and 140, respectively. It will be understood that the system 100 is provided for exemplary purposes only and embodiments of the present invention are not limited to this configuration. For example, as illustrated in FIG. 2, a system 100' includes first and second NIUs 163 and 164 at the service provider facility 110 and a third NIU 168 at the remote terminal 150. The NIUs for each of the customers located in the first, second and third buildings 120, 130 and 140 may be positioned at the service provider facility 110 and/or remote terminal 150. It will further be understood that NIUs may be positioned at both the service provider facility 110/remote terminal 150 and the first, second and third buildings 120, 130 and 140 (customer facilities). Optional NIUs 165, 166 and 167 at the customer facilities are illustrated by the dotted NIUs 165, 166 and 167 illustrated in FIG. 2.

Operations of the systems illustrated in FIGS. 1 and 2 will now be discussed. The first building 120 may include a single customer of Ethernet service. The customer may be running an Ethernet LAN internally. Thus, the customer may be transmitting and/or receiving data internally at 1000 Mbps. The customer in the first building 120 may be a first location of a business, a second location of which may be located in the second building 130. The second location of the business in the second building 130 may also be running an Ethernet LAN, thus the customer in the second building may also be transmitting and/or receiving data internally at 1000 Mbps. However, when the first location of the business located in the first building 120 transmits and/or receives information to and/or from the second location of the business in the second building 130 via conventional telecommunications protocols and/or networks, this information may only be transmitted and/or received at about 1.5 Mbps or less, which is a significant decrease in bandwidth.

In the illustrated embodiment, the customers in the first and second buildings 120 and 130 use NIUs 160, 161 so as to allow the Ethernet LAN of the first location to communicate with the Ethernet LAN of the second location using Ethernet Service that provides a higher rate of transmission, for example, 10 Mbps over copper loop connections and 100 Mbps or 1000 Mbps over fiber optic cable connections. In particular, the first NIU 160 is positioned in the housing 170 and connected to the Ethernet LAN of the first location and to a service provider network at the service provider facility 110. The first NIU 160 is configured to provide an Ethernet interface between the Ethernet LAN at the first location and the service provider network at the service provider facility 110. Similarly, the second NIU 161 is positioned in the housing 171 and connected to the Ethernet LAN of the second location and a service provider network at the service provider facility 110. The second NIU 161 is configured to provide an Ethernet interface between the Ethernet LAN at the second location and the service provider network at the service provider facility 110. Thus, Ethernet service may be provided between the Ethernet LAN at the first location and the Ethernet LAN at the second location through the service provider network at the service provider facility 110.

Furthermore, a third customer completely unrelated to the first business may be located in the first building 120 may be running another Ethernet LAN. Accordingly, a third NIU may be positioned in the housing 170 and connected to the Ethernet LAN of the third customer and the service provider network at the service provider facility 110. Thus, the third customer may also communicate with the first and second customers using Ethernet service through the service provider network at the service provider facility 110. Accordingly, it will be understood that embodiments of the present invention provide Ethernet service so as to allow customers to communicate with other locations of a customer's business, as well as third party businesses.

Furthermore, the service provider may also use the NIUs to troubleshoot the signal lines between the service provider facility 110 and the first, second and third buildings 120, 130 and 140 as discussed above. The data obtained from the diagnostic tests originated at the service provider facility may be used to provide highly reliable high speed data connection between LANs at customer facilities.

It will be further understood that the example set out above is provided for exemplary purposes only and that embodiments of the present invention are not limited to this configuration. For example, a third location of the business described above may be located in the third building 140. An Ethernet LAN may be running at the third location in the third building 140. The NIU 162 in housing 172 may connect the Ethernet LAN running at the third location to the service providers network at the service provider facility 110. Thus, Ethernet service may be provided between the third Ethernet LAN at the third location and the first and Ethernet LANs at the first and second locations, respectively, through the service provider network at the service provider facility 110. Furthermore, the third Ethernet LAN at the third location may also communicate with the unrelated business in the first building 120 using Ethernet service.

Embodiments of the present invention can be used to provide Ethernet service between two or more remotely located Ethernet LANs. This may provide businesses with greater flexibility because, for example, this may enable them to purchase only the bandwidth they need and to modify this bandwidth on an on-demand basis. For example, customers may modify their Ethernet bandwidth allocation in 1 Mbps increments. Accordingly, embodiments of the present invention may allow service providers to deliver up to 10 Mbps of bandwidth over copper loop connection and a Gigabit of connectivity over fiber optic cable connections at full customer service area distances of, for example, up to about 12,000 feet using copper and greater distances using fiber. Furthermore, NIUs according to embodiments of the present invention may also allow the functionality and operation of the signal lines to be monitored and tested from a remote location, thus, enabling the service provider to offer highly reliable high speed data service between LANs.

Figure 5:
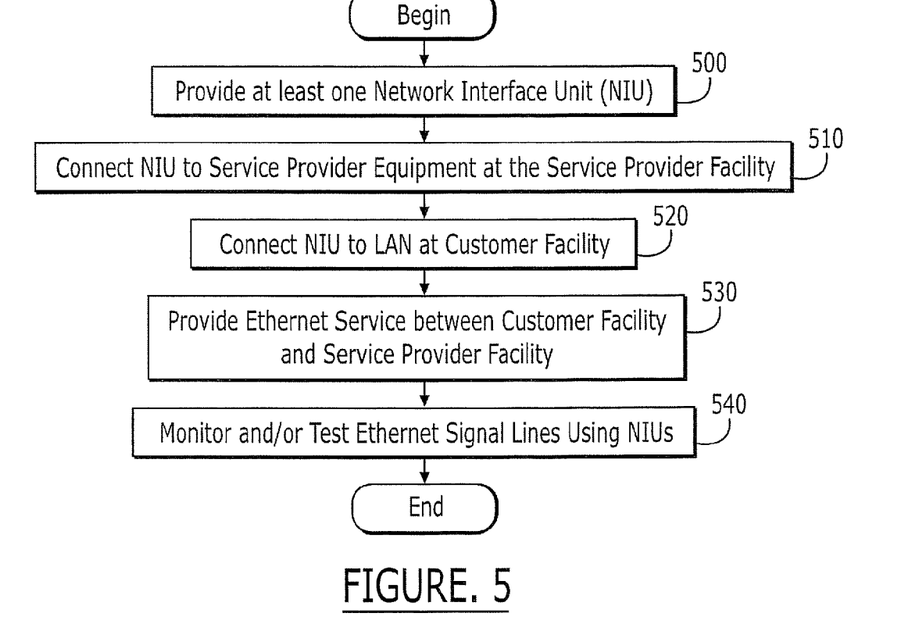
FIG. 5 is flowchart illustrating operations according to embodiments of the present invention.

Operations according to embodiments of the present invention will now be discussed with respect to the flowcharts of FIGS. 5 through 7. It will be understood that the methods and operation discussed with respect to FIGS. 5 through 7 may be used in combination with any of the systems discussed above with respect to FIGS. 1 and 2 without departing from the teachings of the present invention. Referring now to FIG. 5, operations begin at block 500 by positioning at least one NIU. As discussed above, an NIU is positioned at a customer facility, a service provider facility or both. The NIU may be positioned in a housing, for example, a T200 and/or T400, which may be placed in a neutral location so that it may be accessed by a technician. It will be understood that both conventional telecommunications interface cards, for example, T1 network interface cards, and NIUs according to embodiments of the present invention may be provided in the same housing without departing from the teachings of the present invention. The NIU is connected to service provider equipment at the service provider facility (block 510) using, for example, copper wire and/or optical fiber cable. The NIU is also connected to, for example, an Ethernet LAN running at a customer facility (block 520). The NIU may be connected to the Ethernet LAN, for example, via a connector adapted to be received in a port provided on the NIU. Ethernet service may be provided between the customer facility, i.e. a remote location, and the service provider facility (block 530). In other words, the Ethernet LAN running internally at the customer facility is extended to outside the building housing the customer facility. Thus, the service gap between high speed LANs and conventional long distance data networks can narrowed by providing about 10 Mbps over copper wire and 100 Mbps or 1000 Mbps over fiber optic cable according to embodiments of the present invention.

The Ethernet Service between the customer facility and the service provider facility may be monitored and/or tested using the NIU (block 540). As discussed above, the NIU may be configured to send and/or receive packets that allow the technicians to monitor and/or test the performance of the connection. Performance data may include error reports for packets traveling on the service provider end of the signal connection or traveling on the customer's LAN. The NIU may also be configured to operate in a loop back mode, where a specific pattern of information may be transmitted to the customer facility, traverse the signal line to the NIU and/or the LAN at the customer facility and transmitted back to the service provider facility from the customer facility. The original pattern may be compared to the pattern transmitted back to the service provider facility to verify that the Ethernet service is functioning properly. Thus, the NIU may provide both a physical media conversion device as well as a diagnostics tool for monitoring and/or testing the Ethernet signal between the service provider facility and the customer facility. Accordingly, the service provider may manage the network up to the point where it hands off the signal to the customer's LAN, which may be done remotely. The data obtained from testing and/or monitoring the signal line from, for example, a remote location, may be useful in the operation of Ethernet Service between LANs.

Figure 6:
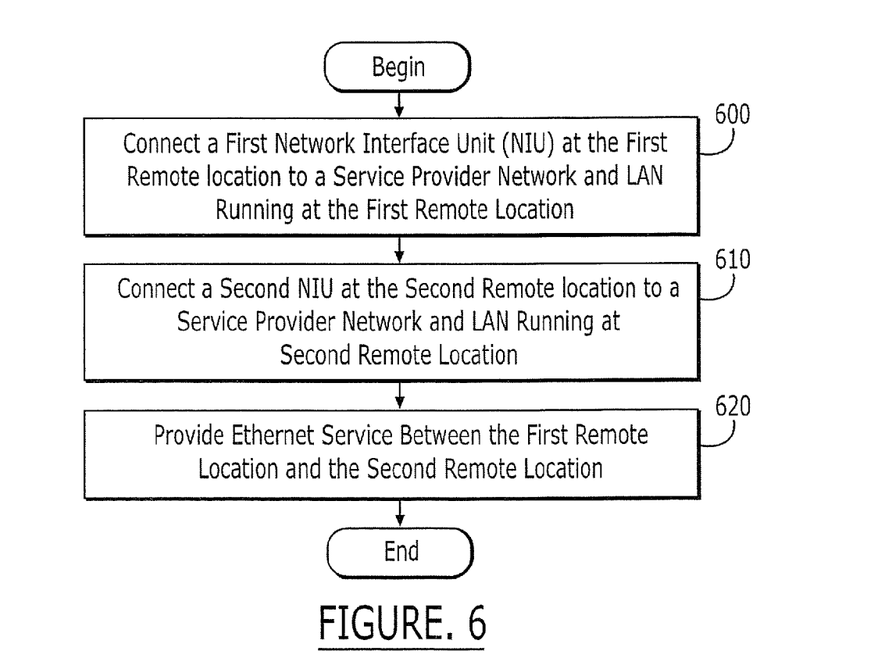
FIG. 6 is flowchart illustrating operations according to further embodiments of the present invention.

Referring now to FIG. 6, operations begin at block 600 by connecting a first NIU at a first remote location to a service provider network and a first Ethernet LAN running at the first remote location. A second NIU at a second remote location is connected to the service provider and a second Ethernet LAN running at the second remote location (block 610). Ethernet service is provided between the first Ethernet LAN at the first remote location and the second Ethernet LAN at the second remote location through the service provider network (block 620).

Figure 7:
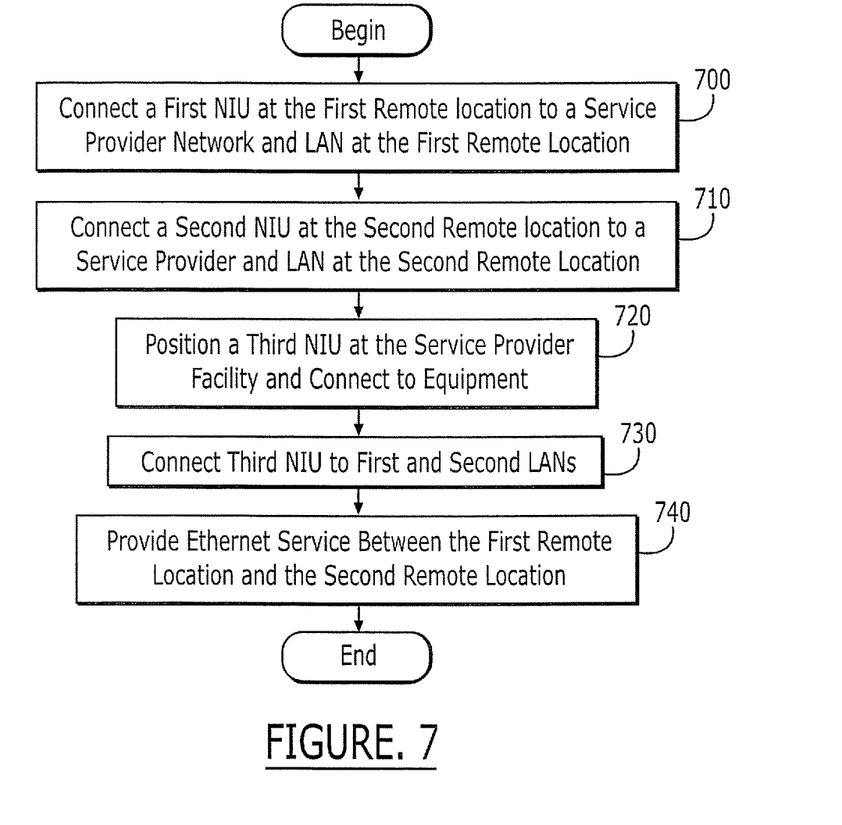
FIG. 7 is flowchart illustrating operations according to still further embodiments of the present invention.

Referring now to FIG. 7, operations begin at block 700 by connecting a first NIU at a first remote location to a service provider network and a first Ethernet LAN running at the first remote location. A second NIU at a second remote location is connected to the service provider and a second Ethernet LAN running at the second remote location (block 710). A third NIU is positioned at the service provider facility and connected to the service provider's Ethernet switching equipment (block 720). The third NIU is connected to the first and second LANs through the first and second NIUs, respectively, using, for example, copper wire and/or optical fiber (block 730). Ethernet service is provided between the first Ethernet LAN at the first remote location and the second Ethernet LAN at the second remote location through the third NIU positioned at the service provider facility 110 (block 740).

As briefly described above, embodiments of the present invention provide systems, apparatus and methods for extending Ethernet service outside of LANs running internally at a customer facility. Thus, the service gap between private Ethernet LANs and conventional public data transmission services can be narrowed. For example, according to embodiments of the present invention the bandwidth provided by Ethernet LANs, for example, 1000 Mbps, may be transmitted outside the buildings in which the businesses are housed and delivered at 10 to 1000 Mbps to, for example, remotely located LANs. Accordingly, delivery of high capacity, high margin data services to and/or between customers may be provided. Furthermore, NIUs according to embodiments of the present invention may also provide a means for managing the network up to and including the point where the service provided by the service provider is handed off to the LAN running at the customer facility. Thus, reliable data services may also be provided.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A system that facilitates the provision of Ethernet service between remotely located Ethernet local area networks (LANs), comprising:
at least one network interface unit (NIU) that is configured to provide an Ethernet interface between a first Ethernet LAN at a first remote location and a second Ethernet LAN at a second remote location so as to provide Ethernet service between the first Ethernet LAN and the second Ethernet LAN, wherein the at least one NIU is located at the first remote location and/or the second remote location.

2. The system of claim 1 wherein the at least one NIU further comprises:
a first NIU at the first remote location; and
a second NIU at the second remote location, wherein the first NIU is configured to provide a first interface between service provider equipment and LAN equipment at the first remote location, wherein the second NIU is configured to provide a second interface between the service provider equipment and LAN equipment at the second remote location and wherein the first Ethernet LAN at the first remote location communicates with the second Ethernet LAN at the second remote location through a service provider network provided by the service provider equipment.

3. The system of claim 2 wherein the first NIU is further configured to manage Ethernet service between the service provider equipment and LAN at the first remote location and wherein the second NIU is further configured to manage Ethernet service between the service provider equipment and the LAN at the second remote location.

4. The system of claim 2 further comprising:
a first housing that is configured to receive the first NIU and that is located at the first remote location; and
a second housing that is configured to receive the second NIU and that is located at the second remote location, wherein the first NIU is positioned in the first housing and the second NIU is positioned in the second housing.

5. The system of claim 4, wherein the first and second housings are positioned in neutral locations so as to allow access by a technician.

6. A system that facilitates the provision of Ethernet service between remotely located Ethernet local area networks (LANs), comprising:
at least one network interface unit (NIU) that is configured to provide an Ethernet interface between a first Ethernet LAN at a first remote location and a second Ethernet LAN at a second remote location so as to provide Ethernet service between the first Ethernet LAN and the second Ethernet LAN, wherein the at least one NIU is located at the first remote location and/or the second remote location, wherein the at least one NIU further comprises:
a first NIU at the first remote location;
a second NIU at the second remote location, wherein the first NIU is configured to provide a first interface between service provider equipment and LAN equipment at the first remote location, wherein the second NIU is configured to provide a second interface between the service provider equipment and LAN equipment at the second remote location and wherein the first Ethernet LAN at the first remote location communicates with the second Ethernet LAN at the second remote location through a service provider network provided by the service provider equipment; and
a third NIU that is integrated with the service provider equipment, wherein the first Ethernet LAN at the first remote location and the second Ethernet LAN at the second remote location communicate with the service provider network through the third NIU.

7. An apparatus for providing Ethernet service comprising:
at least one network interface unit (NIU), the NIU being configured to provide an Ethernet interface between service provider equipment and customer equipment so as to provide Ethernet service between a service provider network at a service provider facility and an Ethernet local area network (LAN) running at a customer facility and configured to manage the Ethernet service between the service provider network and the Ethernet LAN running at the customer facility.

8. The apparatus of claim 7, further comprising:
a housing positioned between the service provider equipment and the customer equipment at the service provider facility and/or the customer facility, wherein the housing is configured to receive the at least one NIU and wherein the at least one NIU is positioned in the housing.

9. The apparatus of claim 8, wherein the at least one NIU is further configured to test and/or monitor the Ethernet service between the service provider network and the Ethernet LAN running at the customer facility.

10. The apparatus of claim 8 wherein the housing comprises at least one of a T200 mechanical enclosure and a T400 mechanical enclosure.

11. The apparatus of claim 8 wherein the at least one NIU is configured to be electrically coupled to the housing through a 56-pin edge connector.

12. The apparatus of claim 8 wherein the housing is positioned in a neutral location so as to allow access by a technician.

13. The apparatus of claim 7 wherein the at least one NIU comprises first and second NIUs, wherein the first NIU provides a first Ethernet interface between the service provider equipment of a first service provider and the customer equipment of a first customer so as to provide Ethernet service between a first service provider network and an Ethernet LAN running at a first customer facility and wherein the second NIU provides a second Ethernet interface between the service provider equipment of a second service provider and the customer equipment of a second customer so as to provide Ethernet service between a second service provider network and an Ethernet LAN running at a second customer facility.

14. The apparatus of claim 13 wherein the first and second service providers are the same service provider and wherein the first and second customers communicate using Ethernet service provided to the first and second customers by the same service provider.

15. The apparatus of claim 7 wherein the at least one NIU is positioned at the service provider facility and/or at the customer facility.

16. The apparatus of claim 7 wherein the at least one network interface unit is coupled to the service provider equipment through a remote terminal.

17. The apparatus of claim 7 wherein a connection between the at least one NIU and the service provider equipment comprises a copper connection and/or a fiber optic connection.

18. The apparatus of claim 7 wherein the at least one NIU comprises an Ethernet receptacle and wherein a connection between the at least one NIU and the customer equipment is provided by category 5 cable and/or fiber optic cable having a connector that is configured to be positioned in the Ethernet receptacle.

19. The apparatus of claim 18 wherein the Ethernet receptacle is configured to receive an RJ45 and/or an LC connector, wherein the connector of the category 5 cable comprises an RJ45 connector and wherein the connector of the fiber optic cable comprises an LC connector.

20. A method of providing Ethernet service comprising:
providing at least one network interface unit (NIU) between service provider equipment and customer equipment at a service provider facility and/or a customer facility so as to provide Ethernet service between the service provider facility and an Ethernet local area network (LAN) running at a customer facility; and
managing the Ethernet service between the service provider facility and the Ethernet LAN using the at least one NIU.

21. The method of claim 20 wherein providing the at least one Ethernet interface further comprises providing the at least one interface in a housing that is positioned in a neutral location so as to allow access by a technician.

22. The method of claim 20 wherein managing the Ethernet service further comprises testing and/or monitoring the Ethernet service between the service provider facility and the Ethernet LAN using the at least one NIU.

23. The method of claim 20 wherein providing Ethernet service further comprises providing a first Ethernet interface between the service provider equipment of a first service provider and the customer equipment of a first customer so as to provide Ethernet service between a first service provider network and an Ethernet LAN running at a first customer facility and providing a second Ethernet interface between the service provider equipment of a second service provider and the customer equipment of a second customer so as to provide Ethernet service between a second service provider network and an Ethernet LAN running at a second customer facility.

24. The method of claim 23 wherein the first and second service providers are the same service provider, the method further comprising:
providing Ethernet service between the first customer and the second customer through the same service provider network.

25. The method of claim 20 wherein providing at least one Ethernet interface further comprises positioning the at least one Ethernet interface at the service provider facility and/or at the customer facility.

26. The method of claim 20 further comprising coupling the at least one Ethernet interface to the service provider equipment through a remote terminal.

27. The method of claim 20 further comprising coupling the at least one Ethernet interface to the service provider equipment using copper wire and/or a fiber optic cable.

28. A method for providing Ethernet service between remotely located Ethernet local area networks (LANs), comprising:
connecting a first Ethernet LAN at a first remote location to a second Ethernet LAN at a second remote location through at least one network interface unit (NIU) located at the first and/or the second remote location, the at least one NIU being configured to provide an interface between the first and second Ethernet LANs, wherein connecting further comprises:
connecting a first NIU at the first remote location to a service provider network and the first Ethernet LAN;
connecting a second NIU at the second remote location to the service provider network and the second Ethernet LAN;
providing Ethernet service between the first remote location and the second remote location through the service provider network; and
managing the Ethernet service between the first remote location and the second remote location at the service provider network.

29. The method of claim 28 wherein managing the Ethernet service further comprises testing and/or monitoring the Ethernet service between the first remote location and the second remote location using the first and second NIUs.

30. The method of claim 28, further comprising:
   connecting a third NIU integrated located at a service provider facility to the first and second NIUs, wherein the first and second LANs communicate with the service provider through the third NIU.

31. The method of claim 28, further comprising:
   providing the first NIU in a first housing configured to receive the first NIU, wherein the first housing is positioned at the first remote location and wherein the first NIU is positioned in the first housing; and
   providing the second NIU in a second housing that is configured to receive the second NIU, wherein the second housing is positioned at the second remote location and the second NIU is positioned in the second housing.

* * * * *